United States Patent [19]

Brunnschweiler

[11] Patent Number: 4,552,235
[45] Date of Patent: Nov. 12, 1985

[54] CYCLICALLY WEIGHING BULK SOLID MATERIAL

[75] Inventor: David Brunnschweiler, Blackburn, England

[73] Assignee: Haigh Chadwick Limited, West Yorkshire, England

[21] Appl. No.: 487,011

[22] Filed: Apr. 21, 1983

[30] Foreign Application Priority Data

Apr. 21, 1982 [GB] United Kingdom ............... 8211473

[51] Int. Cl.$^4$ ............... G01G 19/52; G01G 13/16; G01G 13/24; G01G 21/10
[52] U.S. Cl. .................................. 177/1; 177/50; 177/59; 177/114; 177/184
[58] Field of Search ............ 177/1, 25, 50, 184, 177/185, 186, 122, 59, 114

[56] References Cited

U.S. PATENT DOCUMENTS

| | | | |
|---|---|---|---|
| 3,254,728 | 6/1966 | Aquadro et al. | 177/122 |
| 3,291,233 | 12/1966 | Mayer | 177/122 |
| 3,986,571 | 10/1976 | Strobel et al. | 177/185 |
| 4,137,976 | 2/1979 | Grayson, Jr. | 177/50 X |
| 4,211,295 | 7/1980 | Gallo | 177/185 |
| 4,320,855 | 4/1985 | Ricciardi et al. | 177/50 X |
| 4,366,872 | 1/1983 | Brunnschweiler et al. | 177/1 |
| 4,398,612 | 8/1983 | Mikami et al. | 177/25 |

FOREIGN PATENT DOCUMENTS

| | | |
|---|---|---|
| 770897 | 11/1953 | United Kingdom . |
| 922851 | 2/1959 | United Kingdom . |
| 1044541 | 3/1963 | United Kingdom . |
| 1319221 | 1/1971 | United Kingdom . |
| 1433101 | 1/1974 | United Kingdom . |
| 2093609 | 2/1982 | United Kingdom . |

Primary Examiner—George H. Miller, Jr.
Attorney, Agent, or Firm—Oblon, Fisher, Spivak, McClelland & Maier

[57] ABSTRACT

A method for cyclically weighing flowable bulk solid material as part of a dispensing process which includes the steps of supplying the material from a continuously operating controllable delivery feed arrangement to a weigh-pan; generating a signal indicative of the amount of material in the weigh-pan; terminating supply of the material from the feed arrangement when the signal indicates a predetermined amount of material in the weigh-pan; causing the weigh-pan, after receiving and weighing all the materials supplied by the feed arrangement up to such termination of the supply, to deliver its contents; preparing the weigh-pan for the next cycle; predetermining a rate of delivery from the weigh-pan in accordance with the requirements of the dispensing process in terms of the average amount delivered per cycle in a cycling frequency; supplying from the feed arrangement material to the weigh-pan through a valve mechanism in which the material accumulates when the weigh-pan is not receiving material from the valve mechanism; and controlling the controllable feed arrangement to supply the materials substantially at the predetermined rate. An apparatus for performing the above-noted method is also disclosed.

9 Claims, 7 Drawing Figures

CYCLICALLY WEIGHING BULK SOLID MATERIAL

This invention relates to cyclically weighing bulk solid material, and is particularly concerned with the cyclical weighing of flowable bulk solid material such, for example, as textile or other fibre and powders such as flour as part of a dispensing process. Such dispensing process may be a process in which fibre or flour or the like is metered at regular or substantially regular intervals so as to produce a desired total weight after a given number of weighings or after a given time interval, or to produce a uniform or substantially uniform known rate of flow of material to a process such as, for example, in the case of fibre to a fabricating, for instance a stitch bonding, process, whereby a uniform fabric of predetermined weight per unit area may be produced.

It can be a problem, when material is dropped into a weighpan, that if some material has accumulated in a feed arrangement—such, for example, as behind a valve in an air blown fibre supply line—a considerable mass of material is dropped suddenly to the weighpan. The inertia of this mass can sometimes take the weight registration above the level preset for feed cut-off, even though the actual weight of material involved is short of the desired weight. This will have the effect that the feed is cut off prematurely and the material will be incorrectly metered, which could lead to bags, for example, being underweight or fabrics being thin or irregular.

On the other hand, too slow a rate of filling the weighpan, while it avoids this problem, can lead to holding up or slowing down downstream process timings.

The present invention provides means by which the risk of overfilling can be avoided and which, further, can increase the rate at which a weighpan can operate thereby improving the efficiency of a weighing or metering operation or reducing the capital cost of weighing or metering equipment required to carry out a given level of operation.

The invention comprises a method for cyclically weighing flowable bulk solid material as part of a dispensing process, in which the material is supplied from a controllable feed arrangement to a weighpan, such supply being terminated on a signal that there is a certain amount of material in the weighpan and the weighpan then delivering its contents and being prepared for the next cycle, the controllable feed arrangement being operated so as to terminate the supply at an optimum time during the cycle.

The optimum time may be determined with reference to a rate-of-fill signal from the weighpan.

The optimum time may be determined, as lying between a minimum time (within which the weighpan may temporarily indicate an amount of material delivered which is greater than the desired amount due to inertial factors) and a pre-set cycle time which is associated with downstream process timings, so that the downstream processes are not held up or slowed down as a result of an inadequate fill rate from the controllable feed arrangement.

Excess weight registration may be suspended during an early part of the cycle, whereby to avoid the predetermined weight being prematurely registered on account of the inertia of the initial supply dropped from the feed arrangement.

The suspensions of excess weight registration may be initiated at the beginning of each weighing cycle, and excess weight registration may be suspended during an early part of the cycle by a weighing device (such as a load cell) being disabled or disconnected, for a predetermined time period from the beginning of each cycle.

A charge of material to be fed into the weighpan can be accumulated in a supply arrangement during the cycle after the supply has been terminated, the charge thus accumulated being released into the weighpan after the previously weighed charge has been cleared from the weighpan and the weighpan made ready again.

In this way, the rate of operation of the weighpan is substantially increased so that an increased throughput of material can be dispensed or a given throughput can be dealt with by a single weighpan rather than two weighpans operating alternately as is commonly done to ensure a continuous flow of material.

It can be arranged that the suspension of excess weight registration is maintained for slightly longer than the time taken for the material to drop from the feed arrangement. Alternatively, the apparent weight of fibre on the pan, that is to say, the actual weight augmented by the inertia of the fall, can be monitored during the period of suspension, so that the suspension can be terminated when it is clear that the inertial contribution has ceased to have effect. A graph of apparent weight against time might shown an initial steep rise up to a maximum, then a fall to a minimum, then a steady rise at a relatively low rate up to the predetermined weight. Suspension of excess weight registration can be terminated at any time after the said minimum, and, for really fast operation, can be terminated earlier in certain conditions. For example, if the aforesaid maximum is lower than the predetermined weight, the suspension can be terminated as soon as the maximum has been reached—this might be established by differentiating the weight/time function and observing when the differential became zero. If the apparent weight at this point is greater than the predetermined weight, the termination of suspension is withheld until the apparent weight has fallen below the predetermined weight, or until the subsequent minimum has been passed, whichever is earlier—it being desirable to monitor the minimum in any event in case the initial drop was actually, not merely apparently, in excess of the predetermined weight. It would, of course, be arranged by selecting the rate of feed of material by the feed arrangement in relation to the rate of operation of the weighpan that this would not normally happen. However, it can be tolerated, in the interests of highest efficiency, if the weighpan is operated on a subsequent weighing or weighings to compensate for any actual overweight as described in our co-pending patent application No. 7936211—Publication No. 2 060 947 A published on May 7, 1981.

The rate at which the weigh pan fills up can be monitored with advantage. The rate at which material is fed to the pan may then be adjusted in accordance with the observed rate at which the pan is filling up so as to ensure the optimum rate of fill at any moment. If, for example, the material is fed from a conveyor, and the loading of the conveyor varies from time to time, the conveyor can be speeded up or slowed down if the observed rate of fill is lower than or in excess of the optimum, so as to restore the rate of fill to the optimum. Alarms can also be raised if, for example, the rate of fill is outside predetermined limits during any part of the weighing cycle. This might happen, for instance, if there was a failure of supply of material to the weigh pan, or if the weigh pan doors were to fail to close properly so that material falling into the pan were to pass straight through without being weighed.

The invention also comprises apparatus for cyclically weighing flowable bulk solid material as part of a dispensing arrangement in which material is dropped from a controllable feed arrangement to a weighpan and comprising means to cut off the feed when a predetermined weight is registered, further comprising means operative to suspend excess weight registration during an early part of the cycle whereby to avoid the predetermined weight being prematurely registered on account of the inertia of the inital drop from the feed arrangement.

The apparatus may comprise timer means operative to suspend excess weight registration for a preset time period starting with the initial drop. The apparatus may otherwise comprise means responsive to the apparent weight of fibre on the pan to terminate suspension of excess weight registration after the inertial effect of the initial drop has ceased.

Embodiments of apparatus and methods for cyclically weighing flowable bulk solid material according to the invention will now be described with reference to the accompanying drawings, in which:

FIG. 2C shows the same components of FIG. 2A in a third position, while

Figure 1:
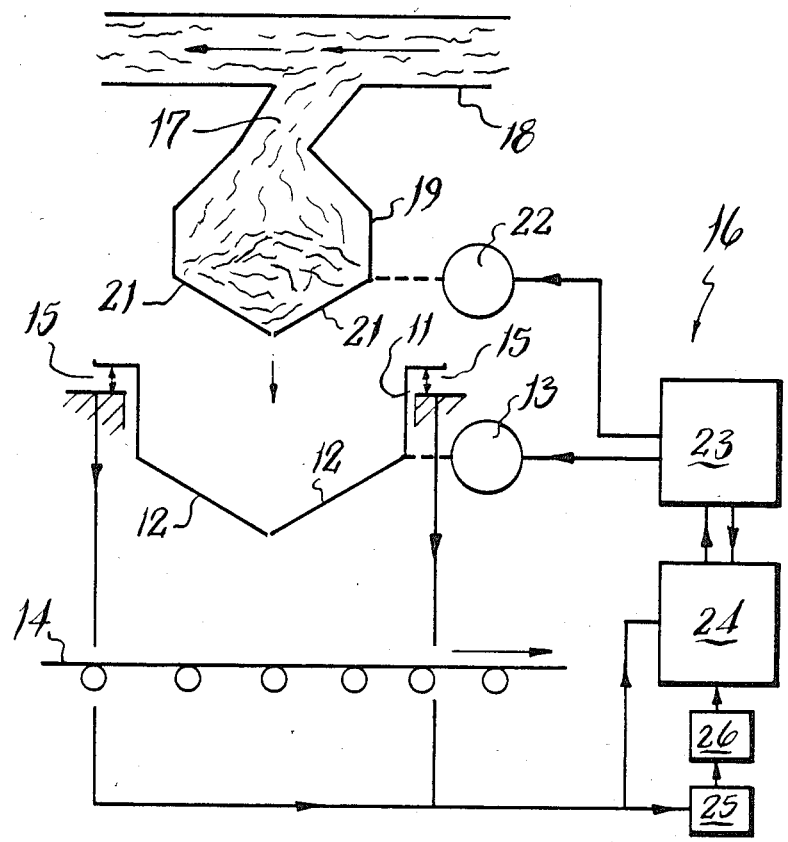
FIG. 1 shows diagrammatically a fibre metering arrangement
Figure 2A:
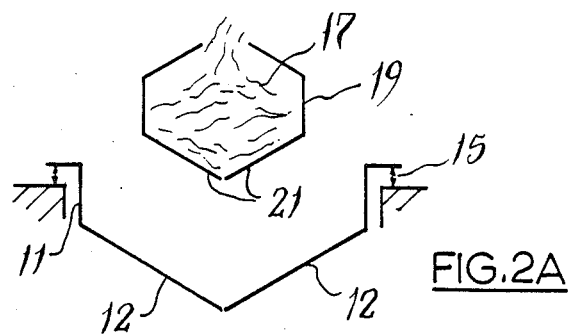
FIG. 2A shows diagrammatically components of the arrangement of FIG. 1 in a first position
Figure 2B:
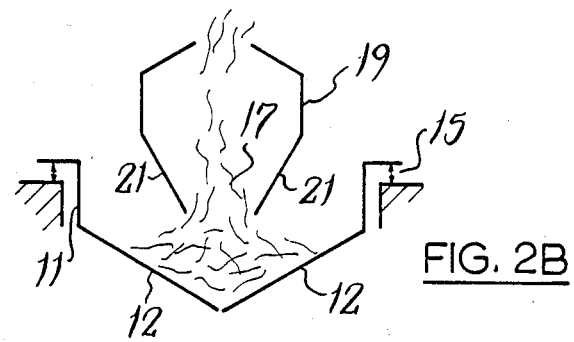
FIG. 2B shows the components of FIG. 2A in a second position.
Figure 2C:
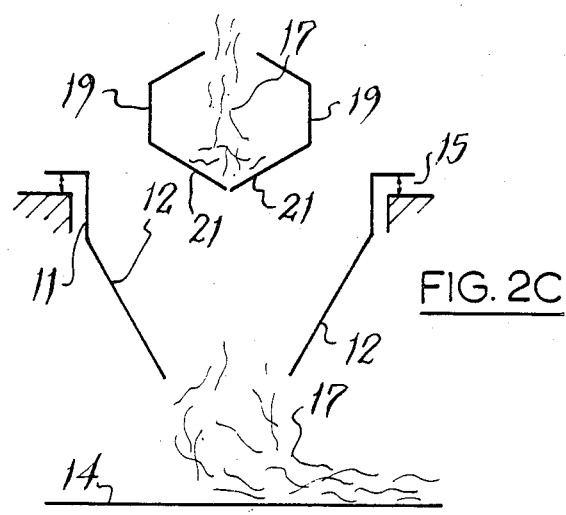

The apparatus illustrated in FIGS. 1 and 2 comprises a weighpan 11 with clam-shell floor members 12 openable and closable by a motor 13 to drop the weighpan contents on to a conveyor 14.

The weighpan is supported on load cells 15 connected to a control arrangement 16.

Material, e.g. textile fibre 17 delivered in an air-blown duct 18 is supplied to the weighpan 11 through a valve 19. Also provided with clam-shell floor members 21 openable and closable by a motor 22. The valve 19 is able to store fibre material 17 when closed, it being arranged that material accumulates there at a rate appropriate to the operating cycle of the weighpan.

When the weighpan 11 is empty and the clam-shell floor members 12 are closed, fibre 17 accumulated in the valve 19 is dropped to the weighpan 11 by actuation of the motor 22 to open the valve 19. Of course, fibre diverted into the open valve 19 from the duct 18 continues to fall to the weighpan 11 so long as the valve 19 remains open. When the desired charge is in the weighpan 11, the valve 19 is closed so that no further fibre falls into the weighpan 11 on this cycle.

Actually, some fibre will be in transit from valve to weighpan even after the valve is closed off, so that the weighpan cannot yet release its charge to the conveyor 14. Sufficient time must be allowed to elapse in order to get an accurate measure of the fibre that will finally reach the weighpan. Moreover, it may be desired to carry out other measurements once the full charge is in the weighpan such for example as a capacitative measurement of moisture content or a measure of the volume of fibre in the weighpan.

Only when all necessary measurements have been made can the weighpan be allowed to discharge its load onto the conveyor 14. It may, of course, be arranged that the weighpan discharges at regular intervals in any event, and the interval will then be chosen so that after the weighpan is fully charged sufficient time remains in the cycle to effect the measurements.

After the valve 19 has been closed and before the clam-shell members 12 of the weighpan 11 close again after releasing the charge, a partial charge builds up in the valve 19 which can be a substantial proportion of the predetermined weight to be dispensed by the weighpan. This partial charge can be released as soon as the members 12 are closed, but the effect of the partial charge falling to the weighpan could be to raise the apparent weight—the actual weight of the partial charge augmented by the inertia due to the speed at which it hits the weighpan—to exceeed the predetermined load at which the valve 19 would be closed again, and the weighpan contents discharged to the conveyor.

In accordance with the invention, however, an operation sequencer 23 that controls the operation of the motors 13 and 22 is itself controlled to ignore any overweight condition arising during an early part of the cycle. This can be effected by a presettable timer, or in response to certain conditions as will be hereinafter explained.

As will be seen from FIG. 1, the load cells 15 (summed or averaged in an appropriate way) are connected to a comparator 24 into which a desired charge weight can be programmed so that a signal is sent by the comparator to the operations sequencer 23 to cause the valve 19 to close and the weighpan to discharge and ready itself for the next charge as well as intermediate weight logging and any other desired, e.g. moisture, volume measurement operations.

However, according to one embodiment, a timer in the operations sequencer 23 inhibits operation of the comparator 24, which effectively prevents actuation of the valve 19 and weighpan 11 clam-shell floors 21, 12 regardless of the relationship of the load cell signal to the programmed load.

According to another embodiment, the apparent weight on the weighpan 11 is monitored during the early part of the cycle, and the signal from the load cells 15 used to determine when an excess weight registration can be fed to or acted upon by the operations sequencer 23 to activate the valve 19 and weighpan 11.

Figure 3A:
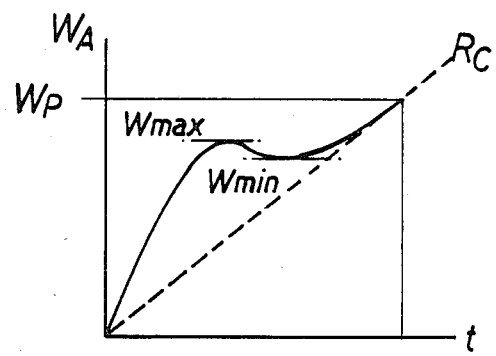
FIG. 3A shows a first weight/time graph
Figure 3B:
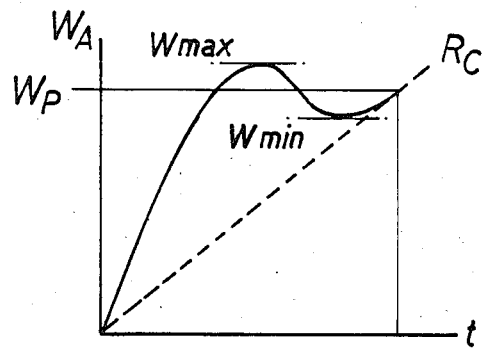
FIG. 3B shows a second weight/time graph.
Figure 3C:
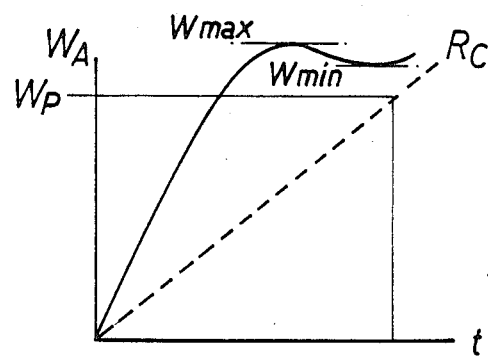
FIG. 3C shows a third weight/time graph.

FIGS. 3A, 3B and 3C show graphs of apparent weight $W_A$ as measured by the load cells 15 against time t. All three graphs show the predetermined weight Wp. The graph of FIG. 3A shows that initially the apparent weight $W_A$ rises steeply if the effects of inertia are felt by the load cells 15. However, it does not reach the predetermined weight Wp, before the curve reaches a maximum at Wmax, them falls to a minimum Wmin before approaching asymptotically the broken line Rc which indicates the theoretical rate at which the weighpan would fill without the intermediary of the valve 19.

FIG. 2B shows what might happen occasionally—or what might, using the invention be planned to happen—if the pre-load in the valve 19 is larger. The apparent weight $W_A$ exceeds the predetermined weight Wp at an early stage in the cycle entirely due to the inertia of the falling material and not representing at all the actual mass of material in the pan. Again, however, the apparent weight falls to a minimum Wmin after passing through the maximum Wnmax, falling, as it does, below the predetermined weight Wp before again increasing as more material flows through the open valve 19 to approach the line Rc asymptotically.

FIG. 3C shows a graph of which the minimum Wmin lies above the predetermined weight Wp—this might occur if the rate of feed in the air-blown duct 18 to the closed valve 19 increased for any reason or if the previous cycle was unduly prolonged so that an unduly large amount of material accumulated in the valve.

In the case of FIG. 3B, the attainment of the minimum value Wmin indicates a time at which the comparator signal can be permitted to actuate the operations sequencer 23 on equality of the loaded weight and the predetermined weight. In the case of FIG. 3C, the attainment of the minimum Wmin dictates that this time is already overdue. In any event, excess weight registration after the minimum can be allowed to actuate the valve and weighpan.

Detection of the minimum is effected by a differentiating circuit 25 which passes a signal to a controller 26 when the differential coefficient of apparent weight with respect to time is zero. Since this occurs also at the maximum Wmax, it is necessary that the controller 25 only enables the comparator 23, by passing an enabling signal to it, on the second zero value of the differential in a cycle.

The differentiating circuit 25 can also be used to monitor generally the rate of fill of the weigh pan, so as to control the rate of flow of fibre into the weigh pan 11. If, for example, after the initial drop, the weigh pan desirably fills up at a given rate, but the differentiating circuit detects that this rate is too low, then it may pass a signal to the motor that drives the fibre blowing arrangement, or to a deflector plate in the duct 18 so as to increase the rate at which fibre falls into the weigh pan 11. If any rate is detected which is outside predetermined limits, an alarm can be raised. If, for example, the floor members 12 failed to close properly so that an expected rate of fill or pattern of indicated weight during the cycle was not achieved, the alarm could be raised and the operation suspended altogether while the condition was checked.

The arrangements described and illustrated enable substantial pre-loads to be accumulated in the valve 19 during operations of the weighpan taking place after the valve has closed, so that a substantial part of the next subsequent charge can be dropped to the weighpan as soon as it is ready after its previous cycle, without risk that the inertia of the sudden drop of such a large preload causes the premature operation of the valve 19 and weighpan 11.

Any overweight condition occurring occasionally as a result of a situation like that illustrated by the graph of FIG. 3C will be corrected on a subsequent cycle or cycles if the method of controlling weighing described in our Application No. 7936211 above referred to is used, as, of course, will any occasional underweight condition. Persistent over- or underweight tendencies can give rise to an alarm condition; overweight being countered by reducing the rate of accumulation of fibre in the closed valve 19—this may be done automatically if desired by a persistent overweight condition due to a FIG. 3C situation triggering a motor to close down the opening from the duct 18.

I claim:

1. In a method for cyclically weighing flowable bulk solid material as part of a dispensing process comprising the steps of:

supplying said material from a continuously operating controllable delivery feed arrangement to a weigh-pan, generating a signal indicative of the amount of material in the weigh-pan, terminating supply of said material from said feed arrangement when said signal indicates a predetermined amount of material in the weigh-pan, causing the weigh-pan, after receiving and weighing all the material supplied by said feed arrangement up to the said termination of said supply, to deliver its contents, and preparing the weigh-pan for the next cycle, the improvement comprising:

predetermining a rate of delivery from said weigh-pan in accordance with the requirements of said dispensing process in terms of the average amount delivered per cycle and the cycling frequency, supplying from said feed arrangement material to said weigh-pan through valve means in which said material accumulates when said weigh-pan is not receiving material from said valve means, and controlling said controllable feed arrangement to supply said material substantially at said predetermined rate.

2. A method according to claim 1, further comprising the step of inhibiting, during an early part of the cycle, termination of the supply of said material from said feed arrangement on said signal indicating a predetermined amount of material in the weigh-pan, whereby to avoid said termination of the predetermined weight being prematurely registered on account of the inertia of the initial supply dropped from the feed arrangement.

3. In a method for cyclically weighing flowable bulk solid material as part of a dispensing process comprising the steps of:

supplying said material from a continuously operating controllable delivery feed arrangement to a weigh-pan, generating a signal indicative of the amount of material in the weigh-pan, terminating supply of said material from said feed arrangement when said signal indicates a predetermined amount of material in the weigh-pan, causing the weigh-pan, after receiving and weighing all the material supplied by said feed arrangement up to the said termination of said supply, to deliver its contents, and preparing the weigh-pan for the next cycle, the improvement comprising:

predetermining a rate of delivery from said weigh-pan in accordance with the requirements of said dispensing process in terms of the average amount delivered per cycle and the cycle frequency, supplying from said feed arrangement material to said weigh-pan through valve means in which said material accumulates when said weigh-pan is not receiving material from said valve means, controlling said controllable feed arrangement to supply said material substantially at said predetermined rate;

inhibiting, during an early part of the cycle, termination of the supply of said material from said feed arrangement on said signal indicating a predetermined amount of material in the weigh-pan, whereby to avoid said termination of the predetermined weight being prematurely registered on account of the inertia of the initial supply dropped from the feed arrangement; and producing a rate-of-fill signal by producing the time-derivative of the weight of said weigh-pan during a cycle, and cancelling the inhibition of said termination of the supply of said material to the weigh-pan when said time-derivative becomes zero.

4. In a method for cyclically weighing flowable bulk solid material as part of a dispensing process comprising the steps of:

supplying said material from a continuously operating controllable delivery feed arrangement to a weigh-pan, generating a signal indicative of the amount of material in the weigh-pan, terminating supply of said material from said feed arrangement when said signal indicates a predetermined amount of material in the weigh-pan, causing the weigh-pan, after receiving and weighing all the material supplied by said feed arrangement up to the said termination of said supply, to deliver its contents, and preparing the weigh-pan for the next cycle, the improvement comprising:

predetermining a rate of delivery from said weigh-pan in accordance with the requirements of said dispensing process in terms of the average amount delivered per cycle and the cycle frequency, supplying from said feed arrangement material to said weigh-pan through valve means in which said material accumulates when said weigh-pan is not receiving material from said valve means, controlling said controllable feed arrangement to supply said material substantially at said predetermined rate; and producing a rate-of-fill signal by producing the time-derivative of the increasing weight of said weigh-pan during a cycle, and controlling said controllable feed arrangement in accordance with said rate-of-fill signal.

5. In an apparatus for cyclically weighing flowable bulk solid material as part of a dispensing arrangement, comprising:

a continuously operating, controllable delivery feed arrangement, a weigh-pan receiving material from said feed arrangement, control means comprising:

a signal generator indicative of the amount of material in the weigh-pan, supply terminating means operative to terminate supply of said material from said feed arrangement when said signal generator indicates a predetermined amount of material in the weigh-pan, and delivery control means operative to cause the weigh-pan, after receiving and weighing all the material supplied by said feed arrangement up to the said termination of said supply, to deliver its contents and to prepare the weigh-pan for the next cycle, the improvement comprising:

valve means in said controllable feed arrangement for controlling the supply of said material to said weigh-pan, in which said material can accumulate when said weigh-pan is not receiving material from said valve means, said control means further comprising means for controlling said controllable feed arrangement.

6. In an apparatus for cyclically weighing flowable bulk solid material as a part of a dispensing arrangement, comprising:

a continuously operating, controllable delivery feed arrangement, a weigh-pan receiving material from said feed arrangement, control means comprising:

a signal generator indicative of the amount of material in the weigh-pan, supply terminating means operative to terminate supply of said material from said feed arrangement when said signal generator indicates a predetermined amount of material in the weigh-pan, and delivery control means operative to cause the weigh-pan, after receiving and weighing all the material supplied by said feed arrangement up to the said termination of said supply, to deliver its contents and to prepare the weigh-pan for the next cycle, the improvement comprising:

valve means in said controllable feed arrangement for controlling the supply of said material to said weigh-pan, in which said material can accumulate when said weigh-pan is not receiving material from said valve means, said control means further comprising means for controlling said controllable feed arrangement; and differentiating means for producing a rate-of-fill signal for said weigh-pan.

7. Apparatus according to claim 19, in which said differentiating means forms part of the said control means.

8. Apparatus according to claim 5, comprising inhibiting means inhibiting, during an early part of the cycle, termination of the supply of said material from said feed arrangement on said signal generator indicating a predetermined amount of material in the weigh-pan.

9. In an apparatus for cyclically weighing flowable bulk solid material as part of a dispensing arrangement, comprising:

a continuously operating, controllable delivery feed arrangement, a weigh-pan receiving material from said feed arrangement, control means comprising:

a signal generator indicative of the amount of material in the weigh-pan, supply terminating means operative to terminate supply of said material from said feed arrangement when said signal generator indicates a predetermined amount of material in the weigh-pan, and delivery control means operative to cause the weigh-pan, after receiving and weighing all the material supplied by said feed arrangement up to the said termination of said supply, to deliver its contents and to prepare the weigh-pan for the next cycle, the improvement comprising:

valve means in said controllable feed arrangement for controlling the supply of said material to said weigh-pan, in which said material can accumulate when said weigh-pan is not receiving material from said valve means, said control means further comprising means for controlling said controllable feed arrangement;

inhibiting means inhibiting, during an early part of the cycle, termination of the supply of said material from said feed arrangement on said signal generator indicating a predetermined amount of material in the weigh-pan; and differentiating means for producing a rate-of-fill signal for said weigh-pan and zero-rate-of-fill detection means controlling said inhibiting means to cancel the inhibiting effect thereof on detection of a zero-time-derivative.

* * * * *